Nov. 3, 1970 C. A. BITTMANN 3,537,919

METHOD OF FABRICATION OF GUNN EFFECT DEVICES

Filed May 22, 1968

INVENTOR.
CHARLES A. BITTMANN

BY Roger S. Borovoy
Alan H. MacPherson

ATTORNEYS 3,537,919

METHOD OF FABRICATION OF GUNN EFFECT DEVICES

Charles A. Bittmann, Los Altos Hills, Calif., assignor to Fairchild Camera and Instrument Corporation, Syosset, N.Y., a corporation of Delaware Filed May 22, 1968, Ser. No. 731,107
Int. Cl. H01l 7/36, 3/00, 7/00
U.S. Cl. 148—175 10 Claims

ABSTRACT OF THE DISCLOSURE

Structural strength is given to a thin layer of N-type Gunn effect material during processing by placing a rim of P-type material around the outer region of one face of this layer. Degenerate N-type layers of Gunn effect material are then grown on the two exposed faces of this layer to ensure good ohmic contacts to both faces of this layer.

BACKGROUND OF THE INVENTION

Field of the invention

This invention relates to Gunn effect devices and in particular to a method of fabricating Gunn effect devices which reduces breakage and produces consistently good ohmic contacts on selected faces of the devices.

Description of the prior art

Gunn effect devices are semiconductor devices, typically composed of gallium arsenide, which when of the proper thickness, can be made to produce an output signal which oscillates at a frequency from about 2 to 40 gigahertz in response to an applied voltage of about 1 to 15 volts. A typical Gunn device consists of a thin layer of gallium arsenide, usually 5 x $10^{-3}$ to 2 x $10^{-4}$ cm. thick, containing two parallel faces. Each face has an electrode in ohmic contact with it. The gallium arsenside is lightly doped with N-type impurities so that the resulting concentration of donor impurities in the semiconductor material is approximately $10^{13}$ to $10^{15}$ per cubic centimeter.

J. B. Gunn, in a paper entitled "Instabilities of Current and of Potential Distribution in Gallium Arsenic and Indium Phosphorous" printed in the Proceedings of the 7th International Conference on the Physics of Semiconductors, Paris, volume 2, Plasma Effects in Solids, Academic Press, c. 1965, pages 199–207, shows that the oscillatory phenomenon in gallium arsenide is related to the motion of a high field domain from one electrode to the other. The domain velocity is comparable to the saturated drift velocity of the majority carriers. Because the frequency of oscillation of Gunn devices is inversely proportional to the distance travelled by the high field domain from one electrode to the other, the devices must be made thinner to increase their oscillatory frequency. Unfortunately, this weakens the semiconductor material. Consequently, the manufacture of thin Gunn effect devices capable of operating at high frequencies is extremely difficult.

Moreover, to achieve a controllable and reproducible oscillation in a Gunn effect device, the electrodes attached to the face of the device must be ohmic contacts. Unfortunately, non-ohmic contacts are often obtained with non-degenerate material with the result that the Gunn effect device operates unsatisfactorily.

SUMMARY OF THE INVENTION

This invention overcomes these disadvantages of prior art Gunn devices. According to this invention, Gunn devices are manufactured by a method which reduces the breakage of thin semiconductor material, while at the same time assuring substantially ohmic contact of electrodes to the semiconductor material.

In accordance with this invention a thin layer of N-type semiconductor material is grown on one face of a lightly doped P-type wafer of semiconductor material using usual epitaxial techniques. The thickness and doping of this layer depend on the operating frequencies and mode of operation of the desired Gunn device. Then selected portions of P-type material are removed from the wafer of semiconductor material, leaving a two-faced body of N-type semiconductor material containing P-type supporting material on one of its faces. The two-faced body of N-type semiconductor material together with its P-type supporting material is again placed in the epitaxial reactor, but this time in a vertical position. Degenerate N-type layers of semiconductor material are then grown to a selected thickness on both faces of the two-faced body of N-type semiconductor material. Metal contacts are evaporated on to the degenerate layers on both sides of the semiconductor material. And finally, the semiconductor material is diced to yield Gunn effect devices which may be packaged by standard, well-known, methods.

To remove all but a rim of P-type material from the wafer, a coating of masking material, typically etching wax, is placed around the edge of the wafer on the side containing predominantly P-type impurities. Then, after the P-type impurity region has been removed, the masking material is removed with a solvent, leaving the desired rim of P-type material.

Because evaporated metal contacts formed on degenerate N-type material are substantially ohmic, the devices produced by the method of this invention contain none of the deficiencies of prior art devices caused by non-ohmic contacts. Furthermore, because the rim of P-type semiconductor material is left around the edge of the wafter throughout the manufacturing process, the N-type layer of semiconductor material can be made as thin as required without the danger of breaking. As a result, manufacturing yields are substantially improved resulting in significant savings.

DESCRIPTION OF THE PREFERRED EMBODIMENTS

Figure 1:
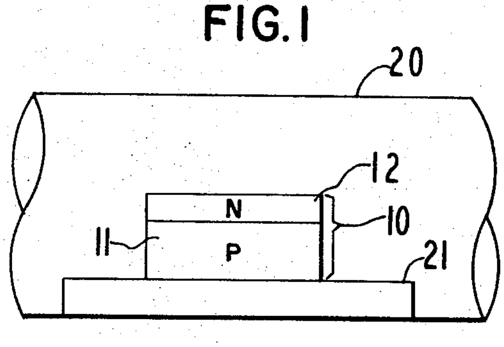
FIG. 1 shows a body of substantially P-type semiconductor material placed in an epitaxial reactor after the growth of an N-type impurity layer.
Figure 4:
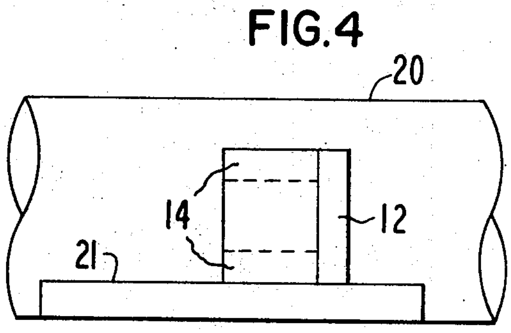
FIG. 4 shows the body of semiconductor material of FIG. 3 placed back in the epitaxial reactor in a vertical rather than a horizontal position.

The method of this invention can best be described with the aid of FIGS. 1–6. In FIG. 1, a lightly doped P-type body of semiconductor material 10, typically gallium arsenide with an acceptor concentration $N_a$ approximately equal to $10^{15}$ per cubic centimeter, is placed on surface 21 in epitaxial reactor 20. Reactor 20 is well-known in the semiconductor arts and thus will not be described in detail. It should also be noted that while to date the Gunn effect has been noted only in thin slices of gallium arsenide, the method of this invention will be of use in fabricating Gunn devices in other materials in which the Gunn effect is found.

A thin layer 12 of gallium arsenide containing a selected concentration of N-type impurities is then grown epitaxially on material 10. The thickness and doping of layer 12 will depend on the required operating frequencies of the Gunn device and the mode of operation, either limited-space-charge-accumulation or Gunn mode. A thickness of 20 microns and a doping of $11^{14}$ per cubic centimeter are typical characteristics of this layer when the device operates in the Gunn mode.

Processes for the epitaxial growth of gallium arsenide on a substrate of gallium arsenide or some other material, are well known in the semiconductor arts. For example, an early process described in an article by Newman and Goldsmith entitled "Vapor Growth of Gallium Arsenide" published in the Journal of the Electrochemical Society, December 1961, p. 1127, passed hydrogen chloride gas over both arsenic and crushed gallium arsenide and then passed this gas over gallium arsenide seed material. To grow a layer of gallium arsenide containing N-type impurities, a source of N-type impurities was also supplied to the epitaxial reactor. Any appropriate epitaxial growth process can, of course, be used with this invention.

Figure 2:
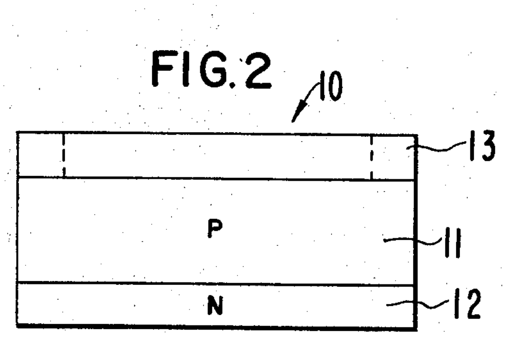
FIG. 2 shows the body of semiconductor material from FIG. 1 after an N-type layer has been grown onto the body of P-type material and a rim of masking material placed around the edge of the P-type material.

After the gallium arsenide is removed from the reactor, a support frame or "rim" of P-type gallium arsenide is formed around the outer region or "edge" of one face of the epitaxially-grown layer 12 of semiconductor material. This rim is thick enough to ensure that the N-type layer 12 will not break in subsequent operations. To do this, an etching wax 13, shown in FIG. 2, is placed around the outer region of the face of the P-type portion 11 of the gallium arsenide. This etching wax could, for example, be Apezon W.

Next, all the P-type material 11 not covered by wax 13, is removed from material 10. This leaves the P-type areas around the edge of the wafer underneath the wax 13. The resulting rim 14 of P-type material (FIG. 3) gives structural support to the layer of N-type material 12. Either etching or electropolishing techniques, both well-known in the device fabrication arts, can be used to remove the desired P-type material. Electropolishing has a distinct advantage in that it only removes the P-type semiconductor material and does not touch the N-type semiconductor material.

Next, the wax 13 is removed from the rim 14 of P-type material by a solvent, typically xylene. The resulting layer 12 of N-type gallium arsenside has additional structural rigidity due to the ridge 14 of P-type material around its edge.

Figure 5:
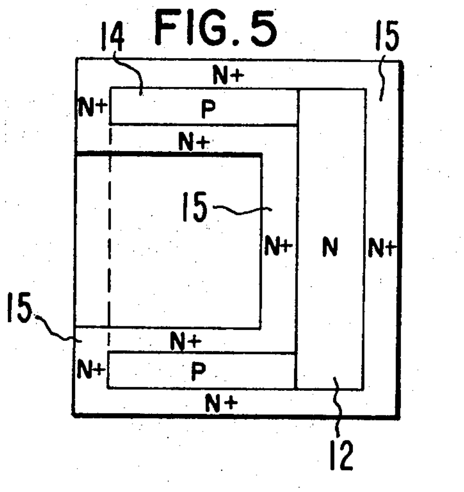
FIG. 5 is a diagrammatic sectional view of the body of semiconductor material of FIG. 3 after it has been removed from the epitaxial reactor of FIG. 4 with degenerate N+ regions on both faces of the body of semiconductor material; and, FIG. 6 shows the semiconductor material of FIG. 5 after electrodes have been attached to the two degenerate layers of the semiconductor material.
Figure 3:
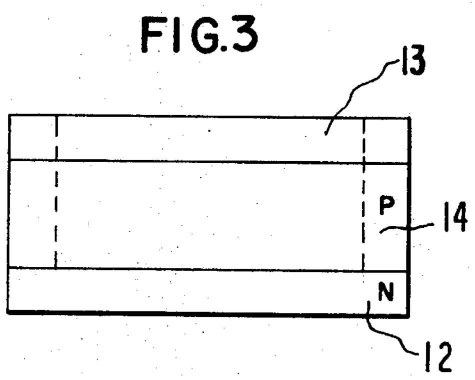
FIG. 3 shows the body of semiconductor material shown in FIG. 2 after all the P-type material except a rim of supporting material, has been removed.

This wafer consisting of the narrow slice 12 of N-type material with the rim 14 of P-type material is now placed again in reactor 20, but this time in a vertical rather than a horizontal position. As described above, a gas containing appropriate gallium and arsenic material together with a large concentration of N-type impurities is now passed through reactor 20. As a result, narrow layers of degenerate N-type material 15 are grown epitaxially. After the degenerate layers of N-type material have grown to a selected thickness, for example one or two microns, the wafer is removed from reactor 20. FIG. 5 shows the resulting structure. Degenerate regions 15 contain an impurity concentration of about $10^{18}$ per cubic centimeter.

Next, rim 14 around the edge of the wafer is removed, typically either by electropolishing or by etching.

Figure 6:
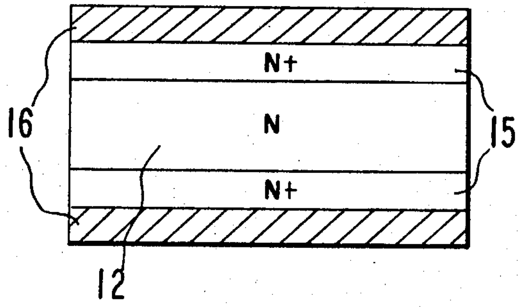

The final step comprises placing metal electrodes on the two sides of the gallium arsenide wafer. These electrodes are placed in contact with the degenerate layers of semiconductor material on both faces of the gallium arsenide by well-known evaporation techniques. These electrodes can, if desired, be alloyed to the semiconductor material. FIG. 6 shows the two metal electrodes 16, typically aluminum, in contact with the degenerate layers 15 on either side of the body 12 of gallium arsenide containing N-type impurities.

Interestingly, the metal contacts on the two layers of degenerate material are always ohmic. As a result, no special semiconductor effects interfere with the operation of the Gunn oscillator. In addition, the presence of the rim of P-type material around the edge of the wafer of N-type material during the processing gives the wafer added structural rigidity and thus, reduces breakage during manufacture.

Other embodiments incorporating the principles of this invention will be apparent to those skilled in the semiconductor process arts in view of this disclosure. In particular, while the support material on the thin layer 12 of N-type gallium arsenside has been described as a rim of P-type gallium arsenide around the outer edge of one face of this layer, other support material geometries can be used if desired. Furthermore, while the substrate 11 initially placed in reactor 20 has been described as gallium arsenide, other appropriate semiconductor materials can also be used in some circumstances.

What is claimed is:

1. The method of producing Gunn effect devices which comprises:

growing epitaxially a layer of N-type material on one face of a wafer of lightly doped P-type semiconductor material;

removing selected portions of P-type material from said wafer of semiconductor material down to the N-type material, thereby leaving a two-faced body of N-type semiconductor material containing P-type supporting material on one of its faces;

growing epitaxially layers of degenerate N-type material on both faces of said body of N-type material; and placing metallic electrodes in ohmic contact with said degenerate layers of N-type material.

2. The method of claim 1 wherein said lightly doped P-type semiconductor material is lightly-doped P-type gallium arsenide and said layer of N-type material is a layer of gallium arsenide containing a selected concentration of N-type impurities.

3. The method of claim 2 in which the acceptor concentration in said lightly-doped P-type gallium arsenide is on the order of $10^{15}$ per cubic centimeter.

4. The method of claim 3 in which the impurity concentration in said two-faced body of N-type gallium arsenide is $10^{14}$ per cubic centimeter.

5. The method of claim 1 including the additional steps of removing said P-type supporting material from said body of N-type material, and cutting said body of N-type material into a plurality of pieces to yield a corresponding plurality of Gunn effect devices.

6. The method of claim 1 in which said step of removing selected portions of P-type material from said wafer of semiconductor material comprises the steps of:

coating an outer region of the face of said wafer on the side containing predominantly P-type impurities with a selected masking material;

removing all the uncoated P-type material from said wafer down to the N-type material thereby leaving a rim of P-type material around the edge of said wafer, said rim of P-type material being coated with said masking material; and, removing said masking material from said rim of P-type material.

7. The method of claim 6 in which said masking material is an etching wax.

8. The method of claim 7 in which said etching wax is Apezon W.

9. The method of claim 6 in which the step of removing all the uncoated P-type material from said wafer comprises electropolishing said wafer thereby to remove all said uncoated P-type material from said wafer without removing any N-type material.

10. The method of claim 1 in which said step of growing layers of degenerate N-type material on both faces of said body of N-type material comprises:

growing epitaxially layers of degenerate N-type material on the order of 2 microns thick on both faces of said body of N-type material.

References Cited

UNITED STATES PATENTS 3,435,306 3/1969 Martin ---------- 317—234 XR

L. DEWAYNE RUTLEDGE, Primary Examiner

W. G. SABA, Assistant Examiner

U.S. Cl. X.R.

29—580; 117—106, 201, 212; 148—1.5; 156—17; 317—234